Sept. 11, 1956     R. N. FALGE ET AL     2,762,932
LIGHT PICKUP UNIT

Filed Nov. 10, 1951     3 Sheets—Sheet 1

INVENTORS.
Robert N. Falge,
George W. Onksen, Jr.,
Harold E. Todd &
BY    Charles W. Miller

*Willito, Helwig & Bailto*
ATTORNEYS.

Sept. 11, 1956  R. N. FALGE ET AL  2,762,932
LIGHT PICKUP UNIT

Filed Nov. 10, 1951  3 Sheets-Sheet 2

INVENTORS.
Robert N. Falge,
George W. Onksen, Jr.,
Harold E. Todd &
BY  Charles W. Miller Willits, Helwig & Baillio
ATTORNEYS.

Sept. 11, 1956  R. N. FALGE ET AL  2,762,932
LIGHT PICKUP UNIT
Filed Nov. 10, 1951  3 Sheets-Sheet 3
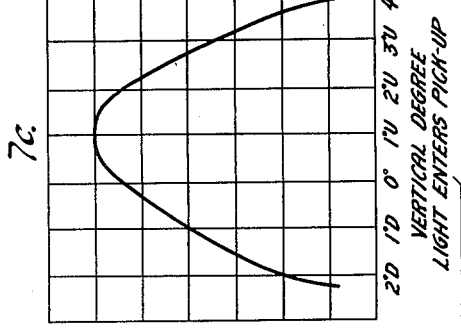
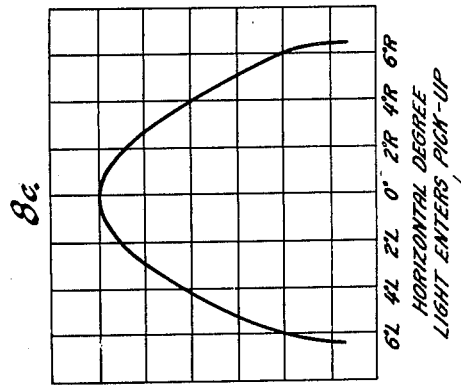
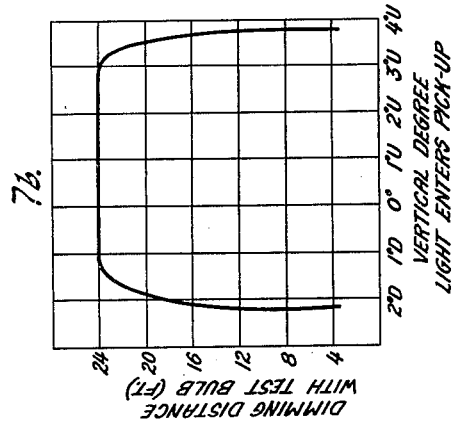
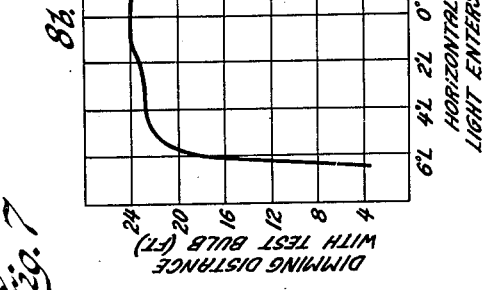
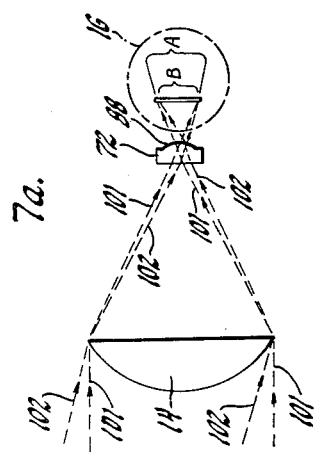
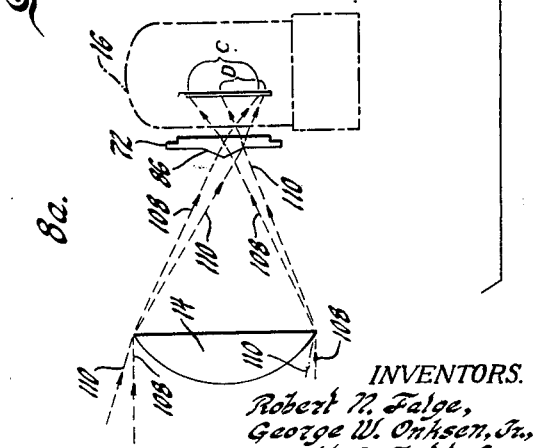
INVENTORS.
Robert N. Falge,
George W. Onksen, Jr.,
Harold E. Todd &
BY Charles W. Miller
ATTORNEYS.

United States Patent Office 2,762,932
Patented Sept. 11, 1956

2,762,932

LIGHT PICKUP UNIT

Robert N. Falge, George W. Onksen, Jr., Harold E. Todd, and Charles W. Miller, Anderson, Ind., assignors to General Motors Corporation, Detroit, Mich., a corporation of Delaware Application November 10, 1951, Serial No. 255,764

15 Claims. (Cl. 250—226)

The present invention relates to light sensitive devices and more particularly to an improved light pickup unit for a light actuated control system such as an automatic headlight dimmer for automotive vehicles.

Light actuated automatic headlight dimmers have been proposed for some years now; however, because of certain difficulties in their operation they have been unsatisfactory and therefore have failed to gain any popularity. Perhaps the greatest defect in these automatic headlamp dimmers is their failure to provide a high sensitivity, which is selective to light originating from the headlamps of oncoming automobiles. In those devices which utilize a highly sensitive system the dimmer becomes subject to actuation by light sources other than those of oncoming vehicles. The proper operation of such a dimmer device is, for example, precluded during the twilight hours since light from the sky has sufficient intensity to actuate the circuit. On the other hand, if a less sensitive system is used, actuation of the dimmer occurs only after the oncoming vehicle is quite close, thus resulting in a switching from high to low beam lights which is too late to accomplish the purpose for which the dimmer was intended.

Another difficulty with the automatic headlamp dimmers which have been proposed in the past is their failure to provide adequate means for gathering light only from within a predetermined angle of approach and also to provide adequate means for uniformly utilizing the gathered light for causing dimmer actuation irrespective of its angle of approach. In prior devices there has been far less sensitivity to light approaching the pickup unit at an angle than to that which approaches from directly ahead. This characteristic is advantageous to the extent that it prevents actuation of the dimmer circuit by street and other lights which are displaced far to the left or right of the vehicle. However, within a certain predetermined relatively small angle it is very desirable to have uniformity of sensitivity to light irrespective of its direction of approach from within that angle. Such a uniformity is advantageous because headlamp dimming results at about the same distance regardless of whether the approaching vehicle is slightly displaced to the left or right or up or down, as would be the case, for example, if the vehicle were rounding a curve or coming over the top of a hill.

Accordingly, it is an object of this invention to provide a light pickup unit for light actuated control systems which has highly increased sensitivity to predetermined types of light. Another object of this invention is the provision of a light pickup which is effective in gathering light only through a predetermined angle of light approach and at the same time is effective in uniformly utilizing the gathered light for control actuation. These objects are carried out in accordance with our invention by the provision of a light pickup unit having novel light directing and filtering means for a photosensitive element and having novel positioning and supporting means. Other objects and advantages of the invention will more fully appear in the following description of the preferred embodiments shown in the accompanying drawings in which:

Figure 7 is a diagrammatic and graphic representation of the vertical optics of the preferred embodiment of the light pickup unit.

Figure 8 is a diagrammatic and graphic representation of the horizontal optics of the preferred embodiment of the light pickup unit.

Figure 1:
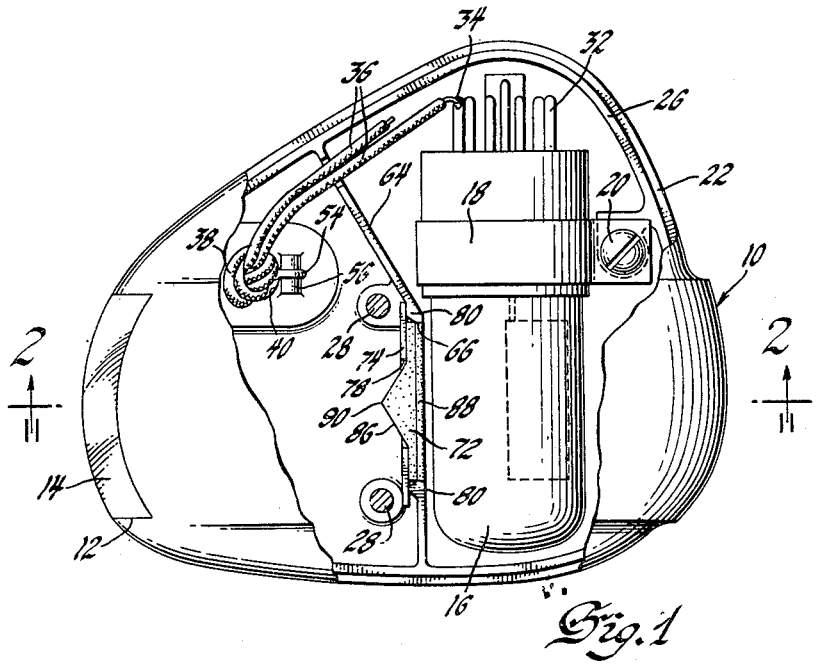
Figure 1 is a top view with parts broken away of the preferred embodiment of the invention.
Figure 2:
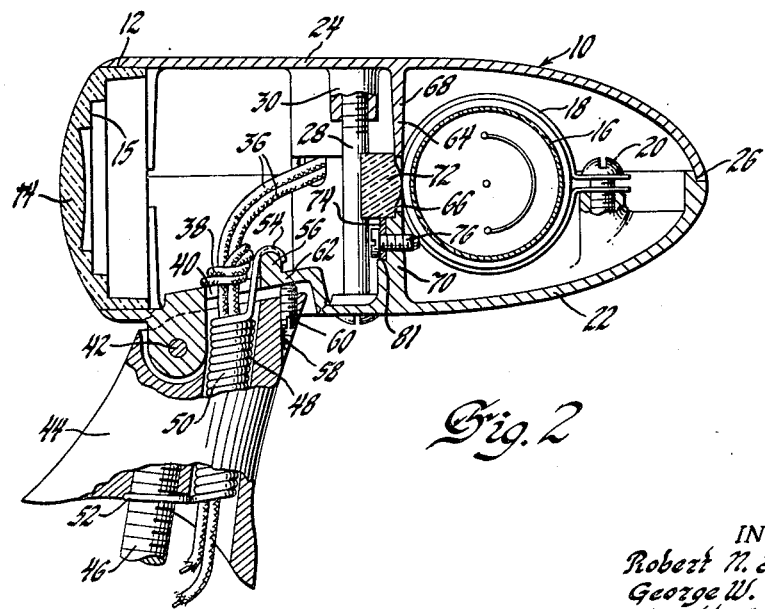
Figure 2 is a cross-sectional view taken on the line 2—2 of Figure 1.
Figure 3:
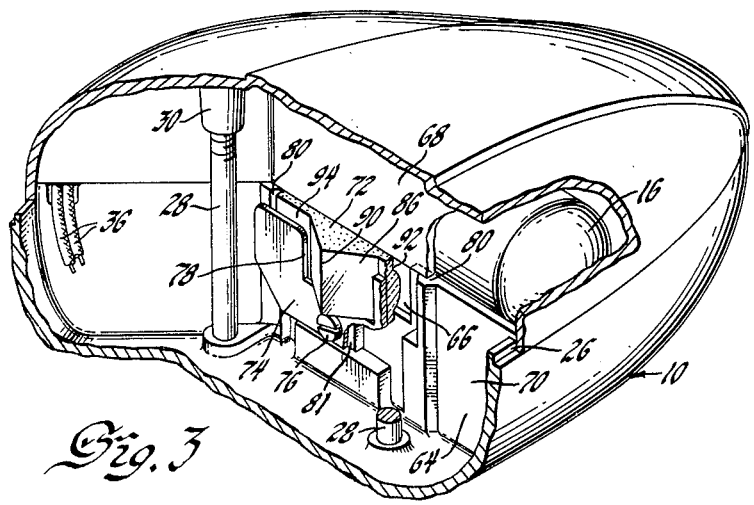
Figure 3 is a perspective view with parts broken away of the embodiment shown in Figures 1 and 2.

Referring now to the drawings, Figures 1, 2 and 3 represent the preferred modification of our invention which includes an opaque housing 10 made of some suitable material such as plastic or metal. The housing is provided with a light transmitting opening 12 covered by a light condensing lens 14. In the embodiment shown the lens 14 has a stepped structure as indicated generally at 15 so as to attain substantially uniform lens thickness; however, any suitable condensing lens structure will suffice. A photosensitive element 16 is mounted in the housing 10 by a support such as bracket 18 which is connected to the housing by a screw member 20. The photosensitive element is mounted so that it faces the light opening, that is, the element is positioned so that its cathode, which is the light sensitive portion of the tube, faces the opening 12.

In the particular embodiment shown the housing comprises a bottom section 22 and a top section 24 maintained in assembled relationship by the overlapping edge joint 26 and by the bolts 28 which pass through the bottom wall of the bottom section 22 and threadedly engage threaded bores provided in the projection 30 which are integral with the top wall of the top housing section 24. Such a sectionally constructed housing facilitates maintenance by allowing easy access to the various enclosed elements.

The electrical contacts 32 of the photosensitive element 16 are provided with suitable electrical connections illustrated at 34 so as to maintain them in electrical contact with the wires 36 which are a part of the control circuit. It is understood that the electrical connections will be arranged to suit the type of photosensitive element used. In the preferred embodiment the wires 36 are connected to the electrical contacts 32 by brazing or soldering the ends of the wires directly to the contacts. Such a means is helpful in preventing the loosening of the electrical connection due to vibration; however, a socket member of the conventional type used with such elements will serve to establish the electrical connection.

It will be noted that the connection 34 is protected from any pulling force exerted on the wires external of the housing by providing an enlargement such as knot 38 adjacent the wire exit opening 40 in the housing 10.

In the preferred embodiment of our invention the support for the housing comprises the structure shown by Figure 2 wherein the housing 10 is hinged at 42 to the support 44 which is adapted for mounting on the vehicle by means of the bolt 46. The support has a through bore 48 in which there is located a spiral spring 50 having its lower end 52 fastened or held to the bolt 46 and its upper end 54 hooked over a projection 56 integral with the bottom of the housing 10. A smaller bore 58 is provided in the support 44 and is threaded for the reception of the adjusting screw 60, the bottom of which is slotted in the usual manner for turning by a screwdriver, and the top of which abuts the bottom portion 62 of the housing. It will be seen that the spring 50 tends to rotate the housing vertically and thereby urges and maintains the bottom portion 62 of the housing against the top of the adjusting screw 60. Thus, by turning the adjusting screw 60, thereby changing its vertical position, the vertical angle of the housing 10 can be adjusted within limits as desired. The hollow center of the spring 50 provides a convenient exit passage for the wires 36 which, as mentioned previously, connect the photosensitive element with the electrical control circuit.

Figure 4:
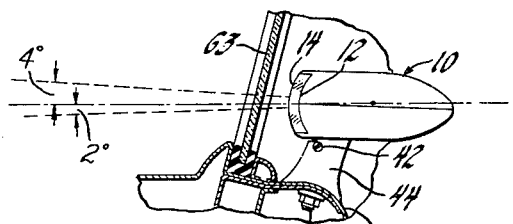
Figure 4 is a view of the pickup unit mounted on a vehicle.

Such a support is extremely useful since it allows vertical aiming of the light pickup unit. The provision of this vertical aiming means allows for the positioning of the unit in various locations on the vehicle with a retention of the highest sensitivity possible for the pick up of light from the desired vertical angle. We have found it best to mount the pickup unit, as is shown in Figure 4, inside the vehicle on the left side and immediately behind the windshield 63 and positioned so that the light opening 12 in the housing 10 faces the windshield 63 for the reception of light passing therethrough. The unit may conveniently be mounted by means of the adjustable support 44 to the top of the instrument panel 65 as shown in Figure 4. Such an inside mounting has several advantages: since the windshield is cleaned frequently, the unit is less troubled with light obstruction from dirt; being inside, the unit is protected from weather; being mounted on the left, the unit can "see" around a vehicle ahead to dim for an approaching vehicle and, being mounted high, the unit can "see" approaching headlamps over a rise in the road at about the same time as the driver. Also, the high mounting permits the effective light angle to be as low as possible without being affected by the back reflections from the vehicle's own headlamps. A low effective light angle permits larger vehicle loading and aiming tolerances.

Separating the photosensitive element 16 from the opening 12 is a partition or wall 64 provided with an aperture 66 which is in line with the opening 12 and the light receiving portion of the photosensitive element 16. In the embodiment shown, the wall 64 consists of an upper section 68 and a lower section 70, upper section 68 being integral with the top section 24 of the housing and lower section 70 being integral with the bottom section 22 of the housing. Thus, the wall 64 which is formed from the abutting upper and lower sections is effective in blocking the light rays from the opening 12 except for those which are transmitted through the aperture 66.

Covering the aperture 66 is the light refracting member 72 which will hereinafter be discussed in detail. The member 72 is maintained in position by the plate 74 which is secured to the wall 64 by the plate retaining screw 76. The plate 74 has a slot 78 which gives it a U-shaped, the slot being necessary of course to allow the transmission of light through the member 72. As can best be seen in Figure 3, the light refracting member 72 is held from lateral and vertical movement by the shoulders 80 and the raised portion 81 which are integral with the lower section 70 of the wall 64. Upward movement of the member 72 can be prevented by merely tightening the screw 76 until there is sufficient frictional force exerted by the plate 74 to prevent such movement.

In one embodiment of our invention the member 72 consists of a light filtering element, which is effective in allowing the passage only of light of a selected color. Such a light filter is particularly advantageous when the photosensitive element used is an electron multiplier type photoelectric tube. This type of tube, which we use in the preferred embodiment of our invention, is hundreds of times more sensitive than the ordinary type photosensitive elements and thus allows for an extremely sensitive control system without the use of considerable amplification equipment in the circuit. However, such a tube is extremely sensitive to blue light. Thus, when used on automatic headlamp dimmers it is subject to actuation during the twilight hours by skylight and, during the nighttime hours, by moonlight. When, however, the electron multiplier tube is used in combination with the filtering element of this invention, the pickup unit retains a high sensitivity to artificial light such as that from vehicle headlamps, but remains relatively insensitive to sky and moonlight. We have found that an amber-colored filter is particularly effective for blocking blue light and for transmitting the light from vehicle headlamps. However, any suitably colored filter can of course be used within the scope of our invention.

Figure 5:
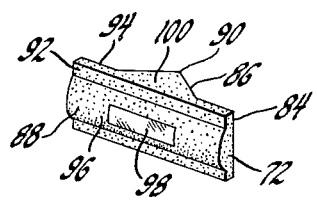
Figure 5 is a perspective view of the preferred embodiment of the light filtering and directing element.

In the preferred embodiment of our invention as shown by Figures 1, 2 and 3, member 72 is shaped so as to give it certain light refracting properties. A shape which we have found particularly suitable to give those infracting properties which are desirable and which will be hereinafter discussed in detail, is shown in Figure 5. Referring to Figure 5, the generally rectangular body 84, which can be of any suitable transparent material such as glass or "Lucite" plastic, is provided with a double prism arrangement 86 on one face and a cylindrical lens 88 on its oppositely disposed face. The longitudinal axis of the cylindrical lens, it will be noted, is parallel with the long dimension of the rectangular body 84 and is at right angles to the ridge line 90 of the double prism arrangement. The dimensions of the double prism 86 on the one face and of the cylindrical lens 88 on the oppositely disposed face are not coextensive with the dimensions of the rectangular body itself, thus providing horizontal flat surfaces 92 on the cylindrical lens face and vertical flat surfaces 94 on the double prism face. As can best be seen in Figure 3, such dimensioning allows the cylindrical lens to fit snugly in the housing wall aperture 66 and the double prism to fit snugly in the plate slot 78, the horizontal and vertical flat surfaces 92 and 94 respectively abutting the housing wall 64 and plate 74. We prefer to mold or cut the entire member 72 from a single integral piece of transparent material; however, it could of course be made of separate parts bonded in some suitable manner.

Referring again to Figure 5, the cylindrical lens face which is the rear face as mounted in the assembly, has a discontinuous covering of some opaque material such as the black paint coating 96 or cardboard, or the like. The discontinuous covering provides a light transmitting window 98. It will be noted that the top 100 as well as the bottom (not shown) of the member 72 are also coated or covered but the front or prismatic face is left uncovered. Thus, when the light refracting member 72 is assembled in the unit as shown in Figures 1, 2 and 3, the window 98 provides the only light opening for the transmission of light from the housing opening 12 to the photosensitive element 16.

In our preferred embodiment the window 98 is positioned at the focal point of the lens 14 and is dimensioned so that a vertical spread angle of about 6° and a horizontal spread angle of about 12° are attained. The horizontal spread angle is uniformly distributed to the left and right; that is, the unit gathers light from about 6° to the left and about 6° to the right. However, as regards the distribution of the 6° vertical spread angle, we have found it advantageous if light dimming is caused only by that light which has a direction of approach within a vertical angle of about 2° below and about 4° above a plane which passes through the center of the lens and which is horizontal when the car is in a level position. This plane will hereinafter be referred to as the horizontal plane of the vehicle. This vertical spread angle of about 4° above and about 2° below is accomplished by positioning the pickup unit on the vehicle so that the center of the window 98 is slightly below the horizontal plane of the vehicle. Such positioning can of course be accomplished by means of the support 44, heretofore described, which allows for vertical angular adjustment.

In Figure 4 we have illustrated the distribution of the 6° vertical spread angle as the pickup unit is mounted on the vehicle. It will be noted that the unit is vertically adjusted so that it gathers light from within an angle of about 4° above and about 2° below the horizontal plane H of the vehicle.

By this proper positioning of the pickup unit so that the center of the window 98 is located below the horizontal plane of the vehicle to the extent necessary to attain a vertical actuating spread angle of about 4° above and about 2° below the vehicle horizontal plane, a system is accomplished which is highly sensitive to oncoming light but which avoids actuation by road reflections of the lights of the vehicle on which it is mounted.

It is understood, of course, that while in our preferred embodiment the window 98 is of a height and width and is positioned so as to make the unit sensitive to light approaching within a vertical angle of about 4° up and about 2° down in respect to the horizontal plane of the vehicle and about 6° left and 6° right in respect to the focal axis of the lens, in some cases it may be desirable to use a window of different size to obtain different light gathering angles.

Since the size of the window determines the light approach angle through which the unit will be effective in gathering light, it is useful to use a lens 14 which has been corrected for spherical aberration in order to attain a more clearly defined focal point or light focus. When such a lens is used, rather than there being a gradual decrease in sensitivity as the angle between the direction of light approach and the lens axis becomes greater, there will be approximately the same magnitude of sensitivity until the approach angle becomes such that the well defined light focal point reaches the edge of the window, at which time there will be a sharp decrease. Thus, the use of a condensing lens corrected for spherical aberration in combination with the window 98 aids in giving a uniform sensitivity to light approaching from within a predetermined and well defined approach angle.

As was mentioned above, the member 72 is shaped so as to impart certain advantageous light refracting properties. These light refracting properties can best be discussed by reference to Figures 7 and 8 which diagrammatically and graphically illustrate the advantageous properties of our light refracting member 72. In Figure 7a which shows the vertical optics of the member 72, the light 101 approaches the lens parallel with the lens focal axis, that is, it approaches from some light source which is directly in front of the light pickup unit. This light is focused by the lens 14 toward the member 72 having the prismatic front face 86, later described with reference to Figure 8, and the cylindrical lens rear face 88 and, after passage through the member, falls across a cathode area designated as A. We wish to point out that we do not here describe nor do we accurately show the precise and detailed refraction of the light by the member 72, but rather emphasize only the net effect of the refraction as regards the cathode area which is affected by this light.

The light 102 approaches the lens 14 at some small vertical angle to the lens focal axis, that is, it approaches from some source which is upwardly displaced from the pickup unit. This light 102 is also focused by the lens 14 toward the member 72 where it is refracted upwardly by the cylindrical lens face 88 in such a way as to cause it to fall on the cathode area B. If the member 72 were not in the system this light would fall on some area below that indicated at B in such a way that some of the light would miss the cathode completely and the remainder would strike the cathode at its bottom-most portion. Due, however, to the use of the member 72 with the cylindrical lens rear face 88, the area B approximates the area A and thus, by means of the cylindrical lens rear face, the cathode area affected by the light 102, which enters the unit from some direction at a vertical angle to the lens focal axis, is approximately the same as the area affected by the light 101 entering the unit from a direction parallel with the lens focal axis. Since the sensitivity of the unit is dependent upon the cathode area impinged by the light rays, and since sensitivity is increased by directing the light so that it contacts the cathode closer to its center, it will be seen that the vertical optics resulting from the light refracting member 72 are such as to impart to the unit a more uniform sensitivity irrespective of the vertical angle of approach of the gathered light.

The diagram illustrates the light rays entering from some source above the unit. The same uniformity of sensitivity will of course occur as regards light entering from some source below the unit except that, as discussed above, the lowest effective light rays are only about 2° below the horizontal plane of the vehicle, whereas light rays up to about 4° above will effect actuation.

The graphs 7b and 7c more clearly illustrate the uniformity attained throughout the vertical actuation spread angle. In graphs 7b and 7c which show the results of tests conducted using a low intensity light source, the dimming distance in feet is plotted against the vertical angle of approach of the light, that is, the vertical angle between the horizontal plane of the vehicle and the line which would indicate the direction of approach of the light. On the graphs the vertical angle is designated as degrees U (up) and degrees D (down). Plot 7c shows the relationship between dimming distance and vertical angle of light approach for a unit not utilizing the light modifying member 72, and plot 7b shows the relationship for a unit employing the member 72. It will be noted from graph 7c that sensitivity decreases very rapidly with an increased vertical angle of light approach when the light refracting member is not used. Thus, while the distance at which dimming will take place with the low intensity light from a test bulb is 24 feet, when the light approaches parallel to the vehicle horizontal plane, the dimming distance decreases to about 15 feet when the light approaches from a direction 1° below and is down to about 8 feet when the light approaches from 2° below. When the member 72 is placed in the system, however, a far greater uniformity is attained. The dimming distance for light approaching parallel to the horizontal plane of the vehicle is about 24 feet. At a 1° downward displacement the distance remains 24 feet, and at a 2° downward displacement falls only to about 18 feet. The graph 7b also very clearly illustrates the sharpness of the decrease in sensitivity at 2° below and 4° above the horizontal plane of the vehicle. It will be noted that, while light entering from 2° below actuates the dimmer at about 18 feet, light of the same intensity approaching from an angle very slightly more than 2° below will cause no actuation whatsoever irrespective of its distance from the unit. Thus, the unit utilizing the light modifying member 72 gathers light only from within a well defined vertical angle and at the same time provides for uniformity of actuation by the gathered light irrespective of its direction of approach.

Figure 8a illustrates the horizontal optics of the light refracting member 72. Light 108 approaching parallel to the lens focal axis is focused by the lens 14 toward the member 72 and refracted by the prismatic face 86 on the member 72 so as to fall on cathode area C. Light 110 approaching at some small horizontal angle to the lens focal axis is focused by the lens 14 and refracted by the prism toward the center of the cathode so as to fall on area D. Except for the presence of the prismatic face 86, some of this light would miss the cathode entirely and the remainder would strike only the edge portion of the cathode. With the member 72 in the system, however, the area affected by the light 110 is close to the cathode center and approximates the area affected by the light 108, thus attaining uniformity of sensitivity irrespective of the horizontal angle of approach of the light.

The graphs 8b and 8c illustrate the advantages of our improved optical system insofar as the horizontal light gathering properties are concerned. Graph 8c is plotted from results obtained in tests conducted with a unit not employing the member 72, while graph 8b is plotted from results obtained in the same tests conducted with a unit employing the member 72. The graphs designate the horizontal angle of light approach as degrees L (left) and degrees R (right). Here again a low intensity test light source was used for test purposes. It will be seen from graph 8b that a sharp decrease in sensitivity is attained at 6° to the left and 6° to the right, and that within these limits there is a great improvement in the uniformity of sensitivity attained irrespective of the horizontal light approach angle. The results shown in graph 8b are in sharp contrast to those illustrated in graph 8c which indicate a gradual decrease in sensitivity as the horizontal approach angle becomes greater.

While in our preferred embodiment we use a light modifying member having one double prism face and one cylindrical lens face, we wish to point out that our invention is not limited to this configuration. A double prismatic face on both sides of the member will, for example, give results comparable to those discussed above. Any member which causes light entering the unit from an angle, vertical or horizontal, to be directed toward that area of the photosensitive element which is contacted by light entering the unit from directly ahead, thus resulting in uniformity of sensitivity, will of course suffice to serve the purposes of the double prism-cylindrical lens faced member discussed above and is therefore within the scope of our invention.

In our preferred embodiment the member 72 is made of some light filtering material such as amber-colored plastic. Thus the unit combines the advantages of light filtering and the advantages of light directing to attain uniformity of sensitivity for selected types of light by the utilization of a light filter having the refracting properties described above. It is of course within the scope of our invention to use separate members for light filtering and for light directing. It is possible, for example, to use a light filtering condensing lens in combination with a light refracting member made of an uncolored material. In some instances it is advantageous, depending upon the specific characteristics which are desired in the pickup unit, to use the light directing means alone so as to attain uniformity of sensitivity or to use the light filtering means alone to attain light selectivity.

Figure 6:
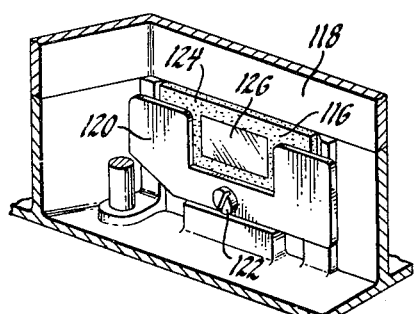
Figure 6 is a perspective view with parts broken away of another embodiment of the invention.

Figure 6 shows an embodiment of our invention using filtering means alone. The structure is the same as that shown in Figures 1, 2 and 3 except that, in place of the light refracting member, a flat sided filter 116 made of some transparent colored material such as amber-colored glass or plastic is used. The flat sided filter 116 is held in position to cover the aperture in the housing wall 118 by the slotted plate 120 which is secured to the housing wall by the screw 122. In the embodiment shown the filter has a discontinuous opaque coating 124 on one side so as to provide the window 126. However, a similar result may of course be accomplished by the use of a plate which instead of being slotted, is provided with an aperture at or near its center.

As was previously mentioned, the use of such a filter is particularly advantageous when an electron multiplier type photosensitive tube is used as the light sensitive element.

By means of our invention a light pickup unit for light actuated control systems which is highly sensitive to selected types of light which gathers light only from within predetermined vertical and horizontal angles of light approach and which has increased uniformity of sensitivity to the gathered light irrespective of its angle of approach, is accomplished. The provision of inside the vehicle mounting on the left side and of vertical aiming means for the unit give additional advantageous features which contribute to the highly improved over-all efficiency of automatic headlamp dimmer systems.

While we have described our invention with reference to particular embodiments thereof, it is not to be so limited since changes and alterations therein may be made which are within the full intended scope of this invention as defined by the appended claims.

What we claim is:

1. A light gathering device for a photosensitive element comprising a housing enclosing said photosensitive element and having an opening therein and a light directing element in said housing, said light directing element comprising a body of transparent material, said body having a cylindrical lens on one face thereof and a double prism on the oppositely disposed face thereof, a discontinuous opaque covering on said face having said cylindrical lens thereon, said discontinuous covering providing a light transmitting window on the face of said cylindrical lens.

2. A light directing and filtering device for a photosensitive element comprising a housing enclosing said photosensitive element and having an opening therein and a light filter element in said housing, said light filter element comprising a body of light filtering material, said body having a cylindrical lens on one face thereof and a double prism on the oppositely disposed face thereof, a discontinuous opaque covering on said face having said cylindrical lens thereon, said discontinuous covering providing a light transmitting window on the face of said cylindrical lens.

3. A light pickup unit for a light actuated control system comprising a housing having an opening therein, a photosensitive element facing said opening, a light condensing lens in said opening, a filter positioned at the focal point of said lens, said filter having a discontinuous covering on one face thereof to provide a light transmitting window, said window limiting the light falling on said photosensitive element to that entering said opening from within a vertical angle of about 3° to the optical axis of said lens and from within a horizontal angle of about 6° to the optical axis of said lens.

4. A light pickup unit for a light actuated control system comprising a housing having an opening therein, a photosensitive element in said housing facing said opening and a light refracting member between said photosensitive element and said opening, said light refracting member having a double prism on one face thereof and a cylindrical lens on the oppositely disposed face thereof.

5. A light pickup unit for a light actuated control system comprising a housing having an opening therein, a photosensitive element in said housing facing said opening, a light condensing lens in said opening, a light refracting member in said housing positioned at the focal point of said lens for directing light from said opening to said photosensitive element, said member having oppositely disposed prismatic and cylindrical lens faces, and means for filtering the light directed to said photosensitive element.

6. A light pickup unit for a light actuated control system comprising a housing having an opening therein, a photosensitive element in said housing, a light condensing lens in said opening, a wall in said housing between said opening and said photosensitive element, said wall having an aperture therein, a filter element covering said aperture, a plate having an opening therein for securing said filter in aperture covering position, means for securing said plate to said wall, said filter having a cylindrical lens on the rear face thereof fitting into said aperture and a double prism on the front face thereof fitting into said plate opening and a discontinuous opaque coating on said rear face, said discontinuous coating providing a light transmitting window.

7. A light pickup unit for vehicle headlight dimming comprising a housing having an opening therein, a photosensitive element in said housing facing said opening, a support for said housing, a hinged joint connecting said support to said housing, said hinged joint allowing vertical rotation of said housing on said support through a predetermined angle, resilient means in said support urging vertical rotation of said housing on said support in one direction and a vertically adjustable screw member on said support abutting said housing and limiting the extent of the rotation urged by said resilient member.

8. A light pickup unit for vehicle headlight dimming comprising a housing having an opening therein, an electron multiplier type photosensitive element in said housing facing said opening, said photosensitive element being blue sensitive, a lens in said opening, a wall between said lens and said photosensitive element having an opening therein at the focal point of said lens, a light refracting filter in said aperture for blocking blue light from said photosensitive element, a discontinuous opaque covering on said filter providing a window for limiting the light falling on said photosensitive element to that approaching said opening from within a predetermined angle, said filter having a double prism on one face thereof and a cylindrical lens on the oppositely disposed face thereof for substantially equalizing the actuating effect of the light falling on said photosensitive element, a support for said housing and means on said support for aiming the pickup unit.

9. A light pickup unit for vehicle headlight dimming comprising a housing having an opening therein, a photosensitive element in said housing facing said opening, a light blocking wall in said housing having an aperture therein, said aperture limiting the light falling on said photosensitive element from said opening to that approaching said unit from within a vertical angle of about 6° and from within a horizontal angle of about 12°, a support for mounting said pickup unit on the vehicle, and means on said support for aiming the pickup unit so that said vertical angle is positioned with 4° above and with 2° below a line passing through the center of said opening and parallel with the horizontal axis of the vehicle.

10. A light pickup unit for a vehicle automatic headlight dimmer device comprising a housing having an opening therein, a photosensitive element in said housing, a condensing lens in said opening, an opaque wall in said housing between said photosensitive element and said lens having an aperture therein located at the focal plane of said lens, said aperture limiting the light falling on said photosensitive element to that approaching said opening from within predetermined vertical and horizontal angles, and optical means in said housing and adjacent said aperture to substantially equalize the actuating effect on said photosensitive element of the light entering said opening irrespective of its angle of approach within said predetermined angles, and mounting means on said unit adapted to secure said unit to a vehicle.

11. A light pickup unit for a vehicle automatic headlight dimmer device comprising a housing having an opening therein, a photosensitive element in said housing, a condensing lens in said opening, an opaque wall in said housing between said photosensitive element and said lens having an aperture therein located at the focal plane of said lens, said aperture limiting the light falling on said photosensitive element to that approaching said opening from within predetermined vertical and horizontal angles, and optical means in said housing and adjacent said aperture to substantially equalize the actuating effect on said photosensitive element of the light entering said opening irrespective of its angle of approach within said predetermined angles, and an adjustable mounting means on said unit adapted to secure said unit to a vehicle and to allow said unit to be aimed.

12. A light pickup unit for a vehicle automatic headlight dimmer device comprising a housing having an opening therein, a photosensitive element in said housing, a stepped spherical condensing lens corrected for spherical aberration in said opening, an opaque wall in said housing between said photosensitive element and said lens having an elongated horizontally disposed aperture therein located at the focal plane of said lens, said aperture limiting the light falling on said photosensitive element to that approaching said opening from within predetermined vertical and horizontal angles, and a light refracting element in said housing and adjacent said aperture to substantially equalize the actuating effect on said photosensitive element of the light entering said opening irrespective of its angle of approach within said predetermined angles, and mounting means on said unit adapted to secure said unit to a vehicle.

13. A light pickup unit for a vehicle automatic headlight dimmer device comprising a housing having an opening therein, an electron multiplier photosensitive element in said housing, a condensing lens element in said opening, an opaque wall in said housing between said photosensitive element and said lens having an aperture therein located at the focal plane of said lens, said aperture limiting the light falling on said photosensitive element to that approaching said opening from within predetermined vertical and horizontal angles, a light refracting element in said housing and adjacent said aperture to substantially equalize the actuating effect on said photosensitive element of the light entering said opening irrespective of its angle of approach within said predetermined angles, light filter means in said housing to block blue light from said electric multiplier photosensitive element, and mounting means on said unit adapted to secure said unit to a vehicle.

14. A light pickup unit for a vehicle automatic headlight dimmer device as set forth in claim 13 and wherein at least one of said condensing lens element and said light refracting element contains the light filter means.

15. In a vehicle having a windshield, a light pickup unit for an automatic headlight dimmer device comprising a housing having an opening therein, a photosensitive element in said housing, a condensing lens in said opening, an opaque wall in said housing between said photosensitive element and said lens having an aperture therein located at the focal plane of said lens, said aperture limiting the light falling on said photosensitive element to that approaching said opening from within predetermined vertical and horizontal angles, and optical means in said housing and adjacent said aperture to substantially equalize the actuating effect on said photosensitive element of the light entering said opening irrespective of its angle of approach within said predetermined angles, and adjustable mounting means on said unit securing said unit to the vehicle behind the windshield thereof so that the opening in said housing faces the windshield.

References Cited in the file of this patent

UNITED STATES PATENTS

| | | |
|---|---|---|
| 1,371,796 | Loudon | Mar. 15, 1921 |
| 1,909,151 | Kleinert | May 16, 1933 |
| 2,147,156 | Geffcken et al. | Feb. 14, 1939 |
| 2,182,987 | Hopkins | Dec. 12, 1939 |
| 2,193,272 | Crossley | Mar. 12, 1940 |
| 2,207,097 | Logan | July 9, 1940 |
| 2,237,579 | Ronning | Apr. 8, 1941 |
| 2,241,059 | Foulds | May 6, 1941 |
| 2,417,023 | Sweet | Mar. 4, 1947 |
| 2,419,641 | Hart | Apr. 29, 1947 |
| 2,434,924 | Hamilton | Jan. 27, 1948 |
| 2,547,071 | Barkley | Apr. 3, 1951 |
| 2,612,817 | Willcox | Oct. 7, 1952 |
| 2,632,040 | Rabinow | Mar. 17, 1953 |